(12) United States Patent
Tortellier

(10) Patent No.: US 6,789,994 B2
(45) Date of Patent: Sep. 14, 2004

(54) INDUSTRIAL TRUCK FOR LIFTING AND SUPPORTING AT LEAST A VEHICLE WHEEL

(76) Inventor: Christian Tortellier, La Heroisiere, 35530 Servon sur Vilaine (FR)

( * ) Notice: Subject to any disclaimer, the term of this patent is extended or adjusted under 35 U.S.C. 154(b) by 38 days.

(21) Appl. No.: 10/181,602
(22) PCT Filed: Jan. 11, 2001
(86) PCT No.: PCT/FR01/00092
§ 371 (c)(1), (2), (4) Date: Oct. 8, 2002
(87) PCT Pub. No.: WO01/53118
PCT Pub. Date: Jul. 26, 2001

(65) Prior Publication Data
US 2003/0091416 A1 May 15, 2003

(30) Foreign Application Priority Data
Jan. 17, 2000 (FR) .......................................... 00 00552

(51) Int. Cl.[7] .............................................. B60B 29/00
(52) U.S. Cl. ........................ 414/429; 414/428; 414/426
(58) Field of Search ................................ 414/426, 427, 414/428, 429, 430, 786; 280/47.34, 47.41, 79.11, 79.4

(56) References Cited
U.S. PATENT DOCUMENTS 3,145,859 A    8/1964  Barosko ...................... 214/331
4,690,605 A  * 9/1987  Coccaro ...................... 414/429
4,692,082 A  * 9/1987  Smith ......................... 414/429
4,854,803 A  * 8/1989  Coccaro ...................... 414/429
5,505,578 A    4/1996  Fuller ......................... 414/427
5,732,960 A    3/1998  Elam ......................... 280/79.4
5,893,571 A  * 4/1999  Nowell ........................ 280/43

FOREIGN PATENT DOCUMENTS

EP    0 317 044 A2    5/1989
FR    2 769 909        4/1999

* cited by examiner

Primary Examiner—James R. Bidwell
(74) Attorney, Agent, or Firm—Westman, Champlin & Kelly

(57) ABSTRACT

The invention concerns a handling trolley for lifting and supporting at least one vehicle wheel The trolley comprises two support assemblies (1a, 1b), fitted on castor wheels and arrangements for altering the position of the two support assemblies relative to each other. Each of the support assemblies comprises a telescopic part (4a, 4b) and a crosspiece (5a, 5b) supporting at least one roller. In accordance with the invention each crosspiece comprises a straight central section (8a, 8b) having one primary free end and one secondary end from which extends a raised end section (11a, 11b). At least one castor wheel is fitted to the lower part of the raised end section. At least one freely rotating roller (12a, 12b) can be fitted to the straight central section. Each of the crosspieces is fitted to the free end of one of the telescopic parts at the primary free end of the straight central section. At least one castor wheel is fitted beneath the free end of each of the telescopic parts.

20 Claims, 6 Drawing Sheets

Fig:2

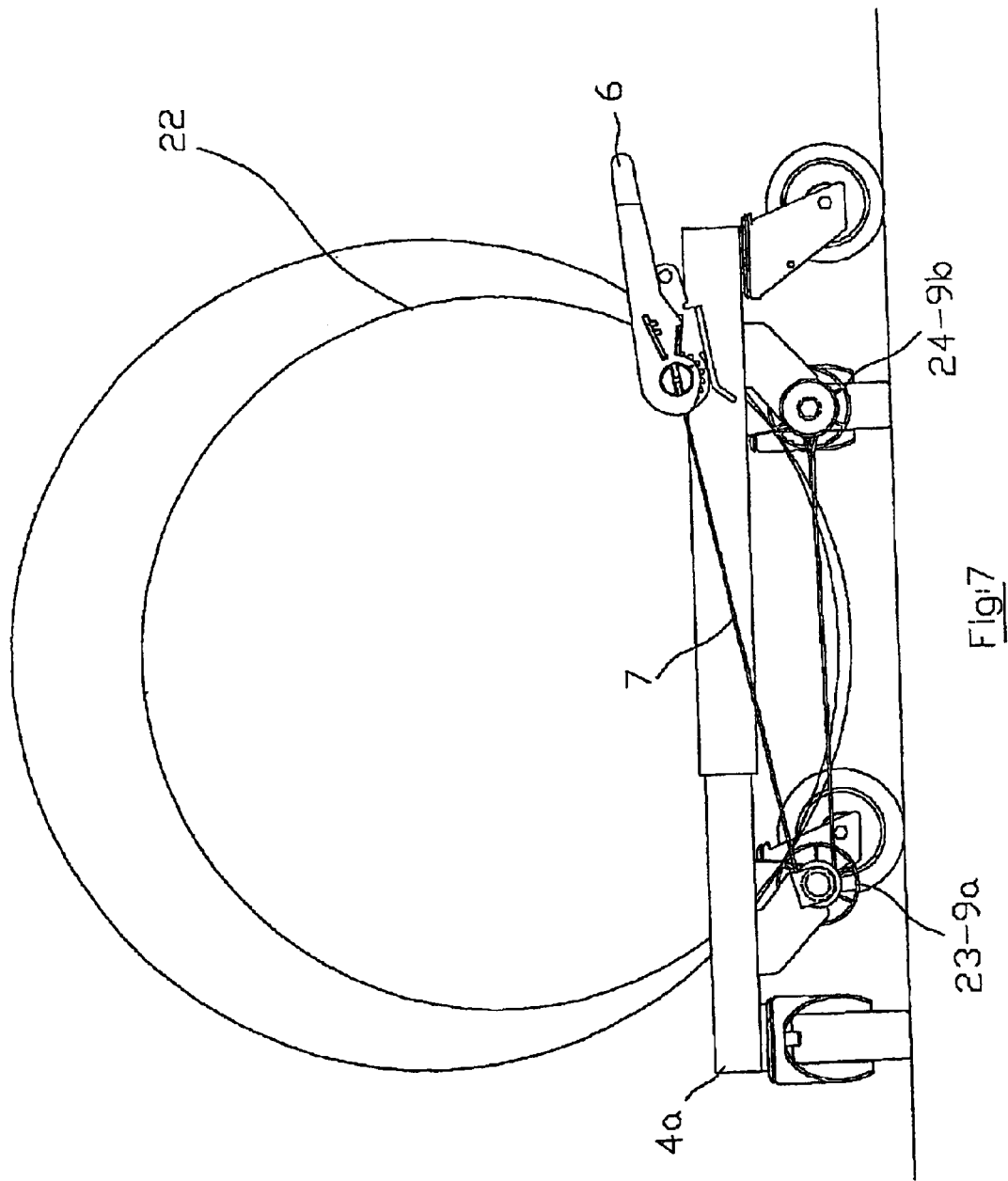

INDUSTRIAL TRUCK FOR LIFTING AND SUPPORTING AT LEAST A VEHICLE WHEEL

CROSS-REFERENCE TO RELATED APPLICATION

This Application is a Section 371 National Stage Application of International Application No. PCT/FR01/00092 filed Jan. 11, 2001 and published as WO 01/53118 on Jul. 26, 2001, not in English.

FIELD OF THE INVENTION

The application of the invention is the lifting of wheel-mounted vehicles, for example in particular but not solely automobiles.

BACKGROUND OF THE INVENTION

Typically, the handling consists of moving a vehicle inside or near to a garage, a workshop (for bodywork, mechanical work, etc.), a showroom, a car park, etc. In general, it is not possible to move the vehicle on its own wheels, because it is has been damaged or it has broken down, or because it is locked with the handbrake or the steering lock on (or in gear).

More precisely, the invention concerns a lifting trolley of the type, which permits at least a wheel of a vehicle to be lifted and supported.

In the following description, the example used is that of an automobile that is to be moved. It is obvious, however, that this invention can be used for all types of vehicles to be moved, provided that it is wheel-mounted.

It is known that to move an automobile, one or more lifting trolleys are to be used. In general, a trolley is placed under each of the two front (or rear) wheels, so that the automobile can be pivoted effortlessly around its rear (or front) axle. Trolleys may even be placed under each of the four wheels, so that the automobile may be turned around completely (again effortlessly), without the assistance of a breakdown truck.

It is known, in the state of the technology, of a lifting trolley structure, composed of two support assemblies, mounted on castors, and mechanisms for moving the two support assemblies in relation to one another. Each of the support assemblies has a telescopic part, which works with the telescopic part of the other support assembly, and a transversal part fixed (in general, more or less perpendicularly) to a free end of the telescopic part, and which supports at least one castor. A trolley with such a structure can adopt in particular a rest position and a raised position. In the rest position, the two telescopic parts are moved apart from one another, so that the trolley may be placed under the wheel to be lifted, with the rollers positioned on either side of the wheel. In the raised position, the two telescopic parts are moved towards one another, so that the wheel is lifted and supported by the rollers.

A first known lifting trolley, which has the previously mentioned structure, is described in the French patent request n° FR 97 14877, registered in the name of Mr. TORTELLIER. In particular, we refer to FIG. 15 of this patent request. In this case, each transversal part has a main body which has a fold which defines a flat portion and an angled portion. The main body is attached, by one end of its flat portion, to the free end of one of the telescopic parts. A pivoting castor is mounted under each of the two ends of the flat portion. Two support brackets are attached to the two ends of the angled portion, to support a spindle (more or less perpendicular to the telescopic parts) on which a roller is mounted and rotates around. Furthermore, the mechanism for moving the two support assemblies with respect to one another, includes a ratchet tensioner that adjusts one strap, one end of which is attached to a support element (or spindle) which in turn is directly attached to one of the telescopic parts.

A second known lifting trolley, which has the previously mentioned structure, is described in the European patent request n° EP 317 044, registered in the name of Mr. COCCARO. In particular, we refer to FIG. 2 of this patent request. In this case, each transversal part has a straight central section with two ends, from each of which runs a section with a stepped end. A pivoting castor is mounted under each stepped end section. The straight central section, as the stepped end sections, are pieces of flat iron. The first (called the first) of the stepped end sections is welded on top of the free end of one of the two telescopic parts. The other (called the second) stepped end section is attached onto one of the ends of the straight central section, by means of a removable coupling. A roller is mounted so that it rotates around the straight central section, by means of two bearing bushes fixed onto the two ends of this straight central section. Furthermore, the mechanism for moving the support assemblies with respect to one another has dual direction gear rack, which is pedal operated.

A variation of the second known trolley is also known, in which a same piece of flat iron forms the straight central section and the second end section. Therefore, no coupling is used.

It appears that neither of the two known trolleys described previously offers a satisfactory solution for the transversal parts, in particular as concerns mounting rollers onto them. It should be remembered that they are mounted both during the initial assembly of the trolley and also each time that the used rollers are changed.

The transversal parts of the first known trolley are relatively complex, and consequently are quite difficult to manufacture and mount. It should be remembered that each transversal part has a main body (with a flat and an angled portion) as well as two brackets which support a spindle on which the roller is mounted and rotates.

The transversal parts of the second known trolley are simpler. In fact, the rollers are mounted so that they rotate directly around the straight central sections. However, with these transversal parts, it is difficult to mount the rollers, as this requires one of the two stepped end sections to be removed first (which is to say the one not welded onto one of the telescopic parts). It should be remembered that the stepped end section to be removed is fixed via a removable attachment to one end of the straight central section, by means of a coupling.

It can be noted that in the case of the previously mentioned variation of the second known trolley, it is also difficult to mount the rollers as to do so it is necessary to remove the castor supported by the second end section. This is in fact obligatory in order to remove the roller by sliding it along the flat iron.

The way in which the rollers are mounted also means that it is necessary to fit two bearing bushes onto each end of each straight central section.

In addition, the rotation of each roller on two bearing bushes causes rapid wear of the internal wall of the roller, and especially the bushes, which means that these parts are changed more often.

Furthermore, the fact that one of the stepped end sections is welded to the top of the free end of one the two telescopic parts means that it is consequently close to the ground when used. The roller on the transversal part in question should also be as close to the ground as possible, but if the telescopic parts are too close to the ground, this can be a problem.

Finally, in the first and second known trolleys, the transversal parts are welded onto the telescopic parts. The trolley therefore is U shaped in general, which means that it is not easy to store or to transport.

The invention aims in particular to overcome these different disadvantages of the state of the technology.

More precisely, one of the objectives of this invention is to provide such a lifting trolley, which has the previously mentioned structure, but which does not have the disadvantages of the transversal parts of the first and second known trolleys described above.

Another objective of the invention is to provide such a lifting trolley whose transversal parts are relatively simple, easy to manufacture and mount and inexpensive.

Another objective of the invention is to provide such a lifting trolley whose rollers can be easily removed and mounted.

Another objective of the invention is to provide such a lifting trolley whose transversal parts have good resistance to loads.

Yet another objective of the invention is to provide such a lifting trolley which can be stored and transported compactly.

An additional objective of the invention is to provide such a lifting trolley which limits the wear of the rollers.

BRIEF SUMMARY OF THE INVENTION

These various objectives, as well as others which will subsequently become apparent, are achieved in the invention with the use of a lifting trolley, the type which permits at least a wheel of a vehicle to be lifted, the said trolley comprising two support assemblies, mounted on castors, and means for moving the two support assemblies with respect to one another, the said trolley being able to be placed in a rest position and in a raised position, each of the said support assemblies including a telescopic part working with the telescopic part of the other support assembly, and a transversal part fixed (in general, more or less perpendicularly) to a free end of the said telescopic part, and supporting at least one castor. According to this invention, each of the said transversal parts has a straight central section with a first free end and a second end from which runs a section with a stepped end, with at least one pivoting castor being mounted and rotating on the said straight central section. Moreover, each of the said transversal parts is attached to the free end of one of the telescopic parts by the said first free end of the said straight central section. At least one castor is mounted under the free end of each of the telescopic parts.

The general principle of the invention therefore consists of simplifying the structure of the transversal parts (rollers mounted directly on the straight central sections but with a single stepped end section for each transversal part) and attaching certain rollers directly to the telescopic parts.

Advantageously, for each of the said transversal parts, the said stepped end section is attached by means of a fixed attachment to the second end of the said straight central section.

Therefore, the structure of the transversal part does not have any coupling (contrary to the second known trolley).

Advantageously, each of the said transversal parts is attached by means of a fixed attachment to the free end of one of the telescopic parts, by the first end of the said straight central section.

In this way, mounting and removing the rollers is simple and rapid. Moreover, the trolley according to the invention may be stored and transported easily and compactly (transversal parts removed and, for example, positioned parallel to the telescopic parts).

In preference, the said removable attachments will have a sheath and associated locking device. The sheaths have the advantage of good load resistance, while remaining simple in terms of their design and application (in particular when mounting/removing rollers).

In preference, the said removable attachments will be located under the free end of one of the telescopic parts. Therefore when operating, the telescopic parts of the trolley according to the invention can be moved further away from the ground than those of the second known trolley. The rollers of the trolley according to the invention remain however as close to the ground as those of the second known trolley.

In preference, the said straight central section of each of the said transversal parts is a section of bar which is more or less cylindrical. In this way, bearing bushes are not required and the wear of the inside wall of the rollers is also limited (thanks to the rotation on a suitably shaped spindle).

In one particular embodiment of the invention, the said mechanism for moving the two support assemblies with respect to one another includes a lifting strap and a device to actuate the said strap so as move the trolley from the rest position to the raised position. The said device for actuating the lifting strap is attached to one of the said telescopic parts. The first end of the said lifting strap is attached to the said device for actuating the lifting strap, and the second end is attached to an end support, which is attached to one of the said transversal parts.

In other words, the end support is not attached directly to one of the telescopic parts, but is attached to one of the transversal parts. This therefore creates a synergy with the general concept of the invention, which provides that one of the ends of the transversal parts has no stepped end section, and therefore does not support a castor.

According to a first advantageous variation, the said end support is attached to that of the said transversal parts which is not attached to the telescopic part upon which the lifting strap actuating device is attached.

Consequently, this means that the strap is directly tensioned. This first variation applies in particular to the production of a trolley for lifting a limited load rapidly.

According to a second advantageous variation, the said end support is fixed to that of the said transversal parts which is attached to the telescopic part upon which the lifting strap actuating device is attached. Moreover, the said strap has a pulley system which passes via an intermediate support, fixed to the said transversal part which is not attached to the telescopic part upon which the lifting strap actuating device is attached.

The strap is consequently tensioned indirectly in this case, which means that the load is halved. This second variation applies in particular to the production of a trolley for lifting a heavier load more slowly.

In preference, the said end support and/or the said intermediate support are part of a unit comprising:

the free end of the straight central section of one of the said transversal parts;

a support, attached at least to a bracket which is part of the attachment of one of the said transversal parts and to the free end of one of the said telescopic parts.

It is clear that the intermediate support is only present in the second variation (pulley system). It can also be noted that in the case of the second variation, the end support and the intermediate support (each situated in one of the two support assemblies) are not necessarily of the same type. In other words, one may be a free end of a straight central section, while the other may be a support.

In preference, the said lifting strap actuating device include a ratchet tensioner. It is important to note that the ratchet tensioner is not only used to tension the lifting strap, but also to lift the wheel.

BRIEF DESCRIPTION OF THE DRAWINGS

Other characteristics and advantages of the invention will become apparent when reading the following description of a preferential embodiment of the invention, given as an example and not as restrictive, and the appended drawings, in which:

FIGS. 5 to 7 each present a view of a second embodiment of the lifting trolley according to this invention, respectively an assembled perspective view (FIG. 5), a plan view (FIG. 6) and a front view (FIG. 7).

DETAILED DESCRIPTION OF PREFERRED EMBODIMENTS

The invention therefore concerns a lifting trolley, the type which at least permits the wheel of a vehicle to be lifted.

We will now present, with reference to FIGS. 1 to 4, a first embodiment of the trolley according to the invention.

The lifting trolley comprises two support assemblies, 1a, 1b, mounted on pivoting castors 2a, 3a, 2b and 3b. A ratchet tensioner 6 and a strap 7 enable the two support assemblies to be moved with respect to one another (see detailed explanation below).

Each of the support assemblies, 1a, 1b, comprises a telescopic part, 4a and 4b, (which fits into the telescopic part of the other support assembly) and a transversal part, 5a and 5b, attached to a free end of the telescopic part (perpendicularly to it).

Each of the transversal parts, 5a, 5b, comprises a straight central section, 8a, 8b, which has a first free end, 9a, 9b, and a second free end, 10a, 10b, to which a stepped end section, 11a, 11b, is joined by means of a fixed attachment (welded for example). Each of the transversal parts, 5a, 5b, is joined by means of a removable attachment to the free end, 13a, 13b, of one of the telescopic parts, 4a, 4b, by the first free end, 9a, 9b, of the straight central section, 8a, 8b. This removable attachment may be achieved for example by blocking (with locking parts such as bolts, 17a, 17b, pins, etc.) the first free end, 9a, 9b, of the straight central section, 8a, 8b, in a cylindrical sheath, 14a, 14b, fixed (by means of two brackets, 15a, 16a, 15b and 16b) to the telescopic part in question, 4a, 4b, and located underneath the latter.

Figure 1:
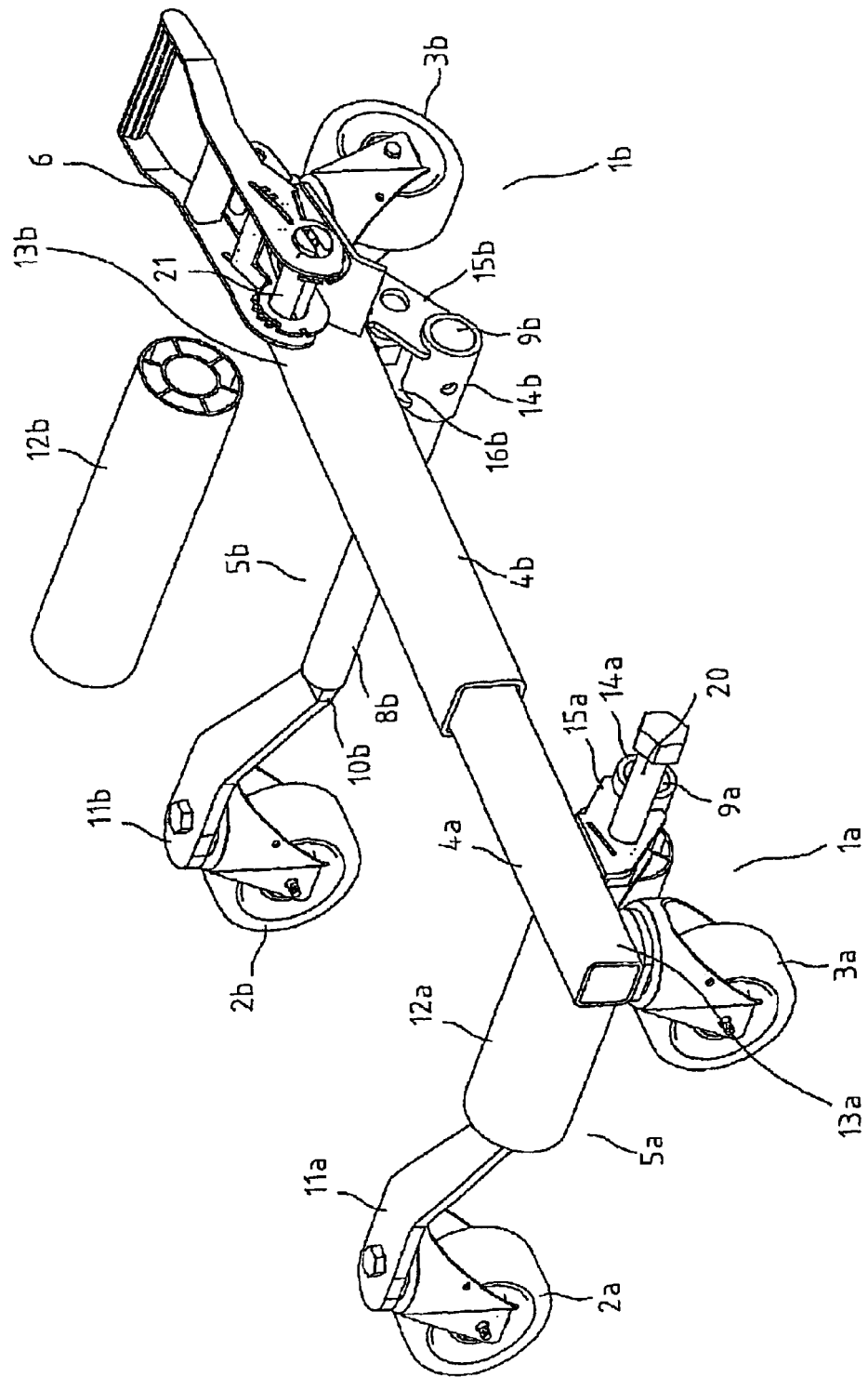
FIGS. 1 to 4 each present a view of a first embodiment of the lifting trolley according to this invention, respectively an exploded perspective view (FIG. 1), an assembled perspective view (FIG. 2), a plan view (FIG. 3) and a front view (FIG. 4)
Figure 2:
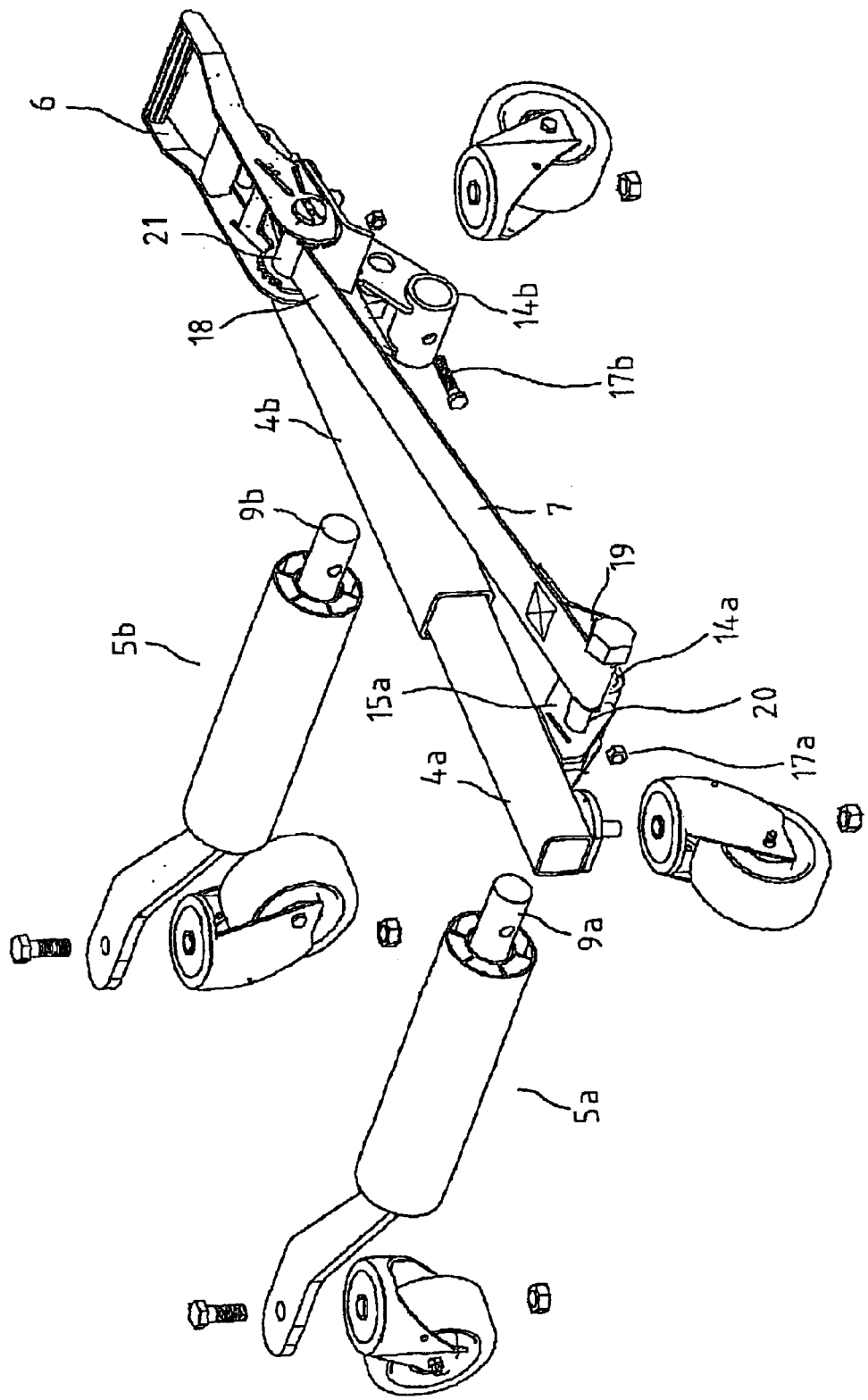
Figure 3:
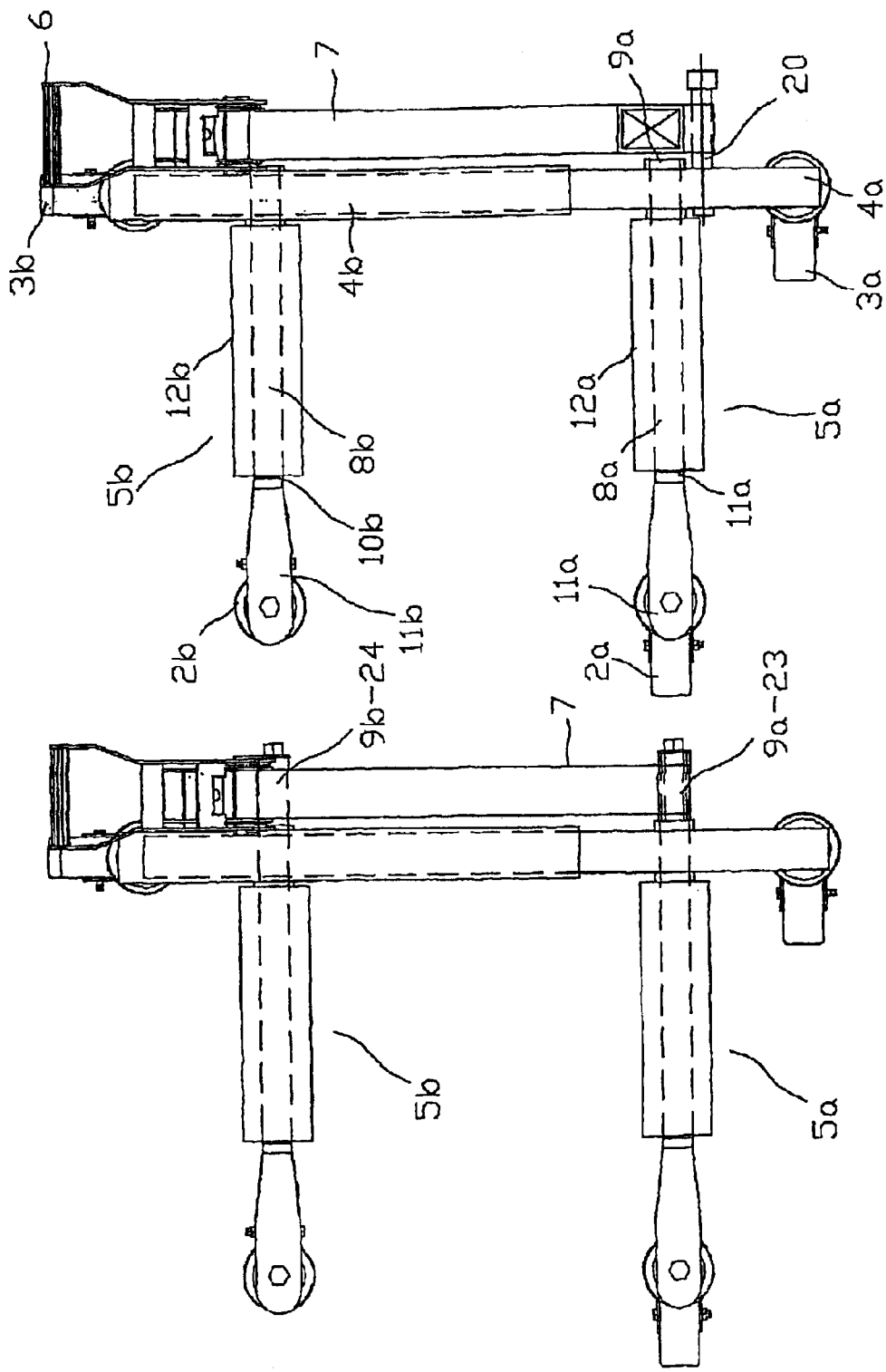
Figure 4:
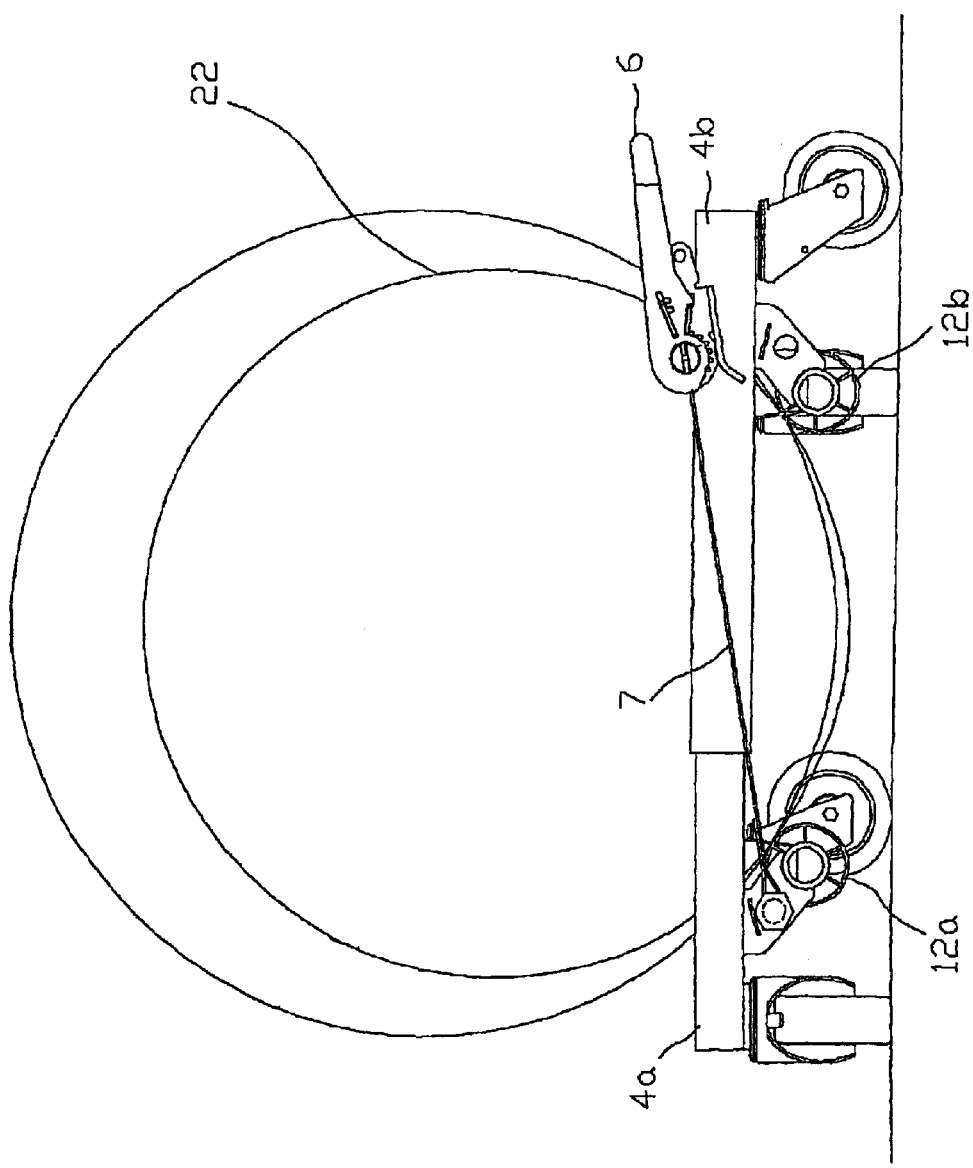

A roller, 12a, 12b, is mounted so that it rotates around the straight central section, 8a, 8b, the latter in fact is a section of cylindrical bar (or a spindle). In FIG. 1, the left roller, 12a, is shown mounted, whereas the right roller, 12b, is shown dismounted.

The previously mentioned removable attachments, 14a, 17a, 14b and 17b, therefore allow the rollers to be easily mounted and removed.

A castor, 2a, 2b, is mounted under the flat portion of each stepped end section, 11a, 11b. A castor, 3a, 3b, is mounted under the free end, 13a, 13b, of each of the telescopic elements, 4a, 4b.

The ratchet tensioner 6 is attached to one of the telescopic parts 4b. The strap 7 has a first end 18 attached to the ratchet tensioner 6, and a second end 19 attached to an end support 20. The latter 20 is fixed by means of a bracket 15a (see below) to the "left" (which is to say the one that is not attached to the telescopic part 4b upon which the ratchet tensioner 6 is attached) transversal part 5a.

In the example shown, the end support 20 is a spindle (or a support part, such as a bolt) fastened to one of the brackets 15a, itself enabling one of the cylindrical sheaths 14a to be attached under the free end 13a of one of the telescopic parts 4a.

According to one variation (not shown), the end support 20 can be the free end 9a of the straight central section 8a of the "left" transversal parts 5a.

We will now briefly summarise the operation of such a trolley. The trolley is first placed in a rest position, so that it may be placed under the wheel to be lifted, with the rollers touching the ground and positioned on either side of the wheel. Then, by moving the ratchet tensioner 6, the operator tensions the lifting strap 7 so that the two telescopic parts 4a, 4b are moved towards one another (which slide into one another) until the rollers 12a, 12b, come into contact with the wheel, on either side of it. The trolley then moves into the intermediate position. Finally, again by moving the ratchet tensioner 6, the operator reduces the length of the lifting strap 7 between the end support 20 and the ratchet tensioner 6. In fact, when the operator actuates the handle of the ratchet tensioner, the lifting strap 7 winds around the spindle which forms the mandrel 21. This brings the two telescopic parts 4a, 4b even closer together (by sliding further into one another) and consequently moving the rollers together horizontally. It can be noted that friction is minimised during lifting as the two rollers rotate on cylindrical bars 8a, 8b. The trolley then reaches the raised position (see FIG. 4), where the wheel 22 is lifted and supported by the rollers 12a, 12b.

Inversely, to release a wheel lifted by the trolley in the raised position, simply open the ratchet tensioner 6 completely (using the manual release system it is equipped with, as usual). The strap 7 then unwinds by means of the mandrel 21, allowing the two support assemblies 1a, 1b (and consequently the rollers 12a, 12b) to separate to allow the wheel to be lowered to the ground.

Figure 5:
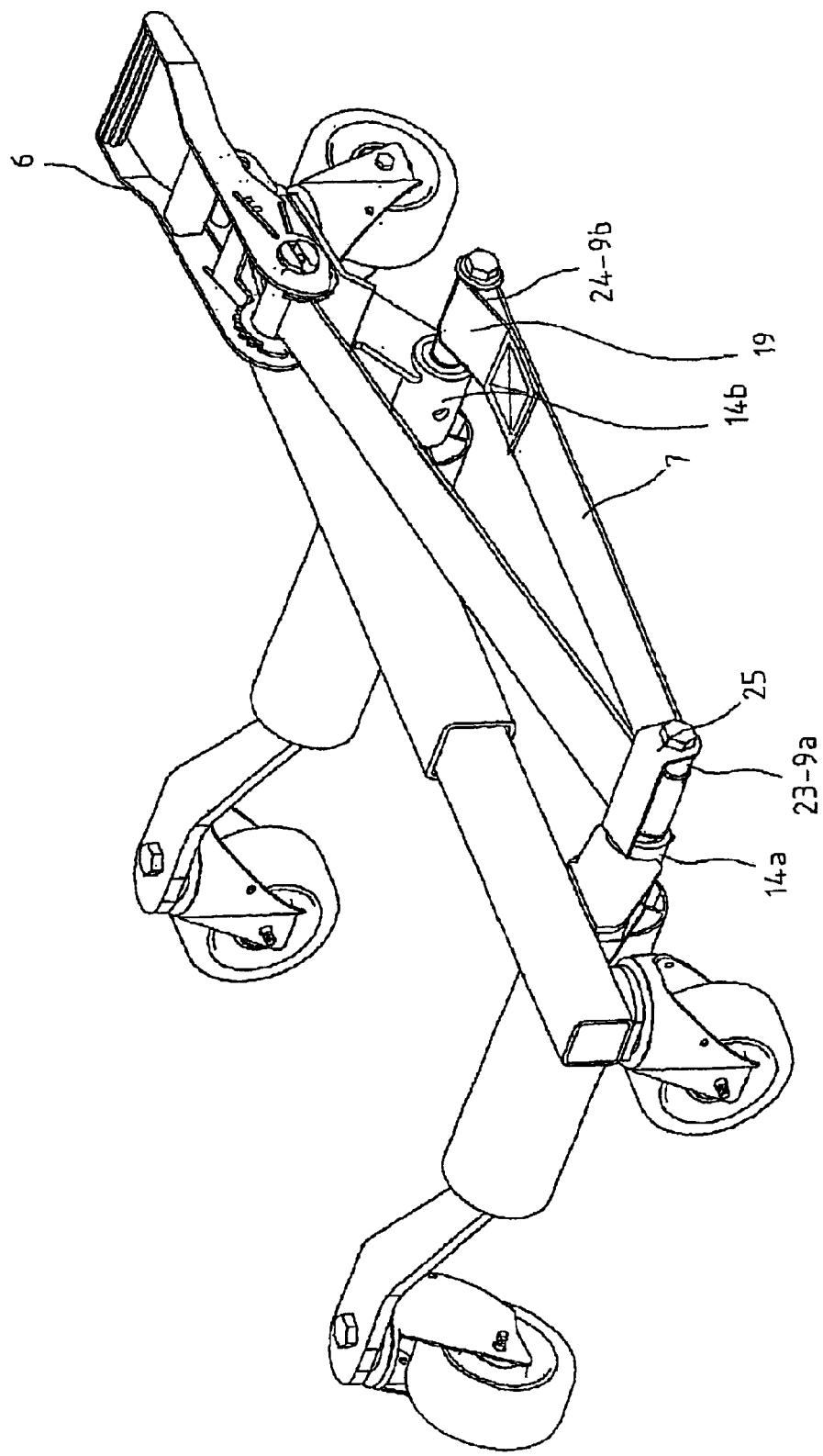

Now, in reference to FIGS. 5 to 7, we will present a second embodiment of the trolley according to the invention. In the following description, we use the same numbered references as those already used for all parts common to both embodiments.

The second embodiment can be distinguished from the first presented above essentially by the fact that the strap 7 is not tensioned directly but indirectly. The strap uses a pulley system where the strap is passed around an intermediate support 23, and the second end 19 of the strap is attached to an end support 24. The intermediate support 23 may possibly function with a bearing bush (not shown) on one side, to prevent the strap from rubbing against intermediate support 23, and on the other side with a clamp 25 to retain the strap. The intermediate support 23 is fixed to the "left" transversal part 5a (which is to say the one that is not fixed to the telescopic part 4b upon which the ratchet tensioner 6 is attached) while the end support 24 is fixed to the "right" transversal part 5b (which is to say the one attached to the telescopic part 4b upon which the ratchet tensioner 6 is attached).

In the example shown, the intermediate support 23 and the end support 24 are the free ends 9a, 9b of the straight central sections 8a, 8b of the "left" 5a and "right" 5b transversal parts respectively.

According to a variation (not shown), these two supports 23, 24 may be spindles (or "supports" such as bolts) each fixed to one of the brackets 15a, 15b, which in turn allow one of the cylindrical sheaths 14a, 14b under the free end 13a, 13b of one of the telescopic parts 4a, 4b.

A hybrid version may also be imagined, in which one of the two supports 23 or 24 is of one type (e.g. a support) and the other support 24 or 23 is of another type (e.g. a free end of a straight central section).

It is clear that many other embodiments of the invention may be envisaged, within the scope of this invention.

What is claimed is:

1. Lifting trolley, the type which permits at least a wheel of a vehicle to be lifted, the said trolley comprising two support assemblies, mounted on castors, and means for moving the two support assemblies in relation to one another, the said trolley can adopt in particular a rest position and a raised position, each of the said support assemblies has a telescopic part, which works with the telescopic part of the other support assembly, and a transversal part fixed more or less perpendicularly to a free end of the said telescopic part, and which supports at least one castor, characterised in that each of the said transversal parts has a straight central section with a first free end and a second end from which runs a stepped end section with at least one castor mounted underneath the said stepped end section, and at least one roller may be mounted so that it rotates around the said straight central section, in that each of the said transversal parts is attached by means of removable attachments to the free end of one of the telescopic parts by the said free end of the said straight central section, and in that at least one castor is mounted underneath the free end of each of the telescopic parts.

2. Trolley according to claim 1, characterised in that, for each of the said transversal parts, the said stepped end section is fixed by means of a removable attachment to the second end of the straight central section.

3. Trolley according to claim 1, characterised in that the said removable attachments have a sheath and an associated locking device.

4. Trolley according to claim 1, characterised in that the said removable attachments are located under the free end of one of the telescopic parts.

5. Trolley according to claim 1, characterised in that the said straight central section of each of the said transversal parts is a section of bar which is more or less cylindrical.

6. Trolley according to claim 1, characterised in that the said mechanism for moving the two support assemblies with respect to one another, includes a lifting strap and a device to actuate the said lifting strap so as move the trolley from the rest position to the raised position, in that the said devices for actuating the lifting strap are located on the said telescopic parts, and in that the said lifting strap has a first end attached to the lifting strap actuating device, and a second end attached to an end support, fixed to one of the said transversal parts.

7. Trolley according to claim 6, characterised in that the said end support is fixed to the said transversal part that is not fixed to the telescopic part upon which the said lifting strap actuating devices are attached.

8. Trolley according to claim 6, characterised in that the said end support is fixed to the said transversal part that is fixed to the telescopic part upon which the said lifting strap actuating devices are attached, and in that the said lifting strap has a pulley system which passes by an intermediate support, which is fixed to the said transversal part that is not fixed to the telescopic part upon which the said lifting strap actuating devices are attached.

9. Trolley according to claim 6, characterised in that the said end support and/or the said intermediate support is/are part of the assembly comprising:

the free end of the straight central section of one of the said transversal parts;

a support, at least attached to a bracket which is part of the attachment of one of the said transversal parts with the free end of one of the telescopic parts.

10. Trolley according to claim 6, characterised in that the said strap actuating devices include a ratchet tensioner.

11. Trolley according to claim 2, characterised in that the said removable attachments have a sheath and an associated locking device.

12. Trolley according to claim 3, characterised in that the said removable attachments are located under the free end of one of the telescopic parts.

13. Trolley according to claim 2, characterised in that the said straight central section of each of the said transversal parts is a section of bar which is more or less cylindrical.

14. Trolley according to claim 2, characterised in that the said mechanism for moving the two support assemblies with respect to one another, includes a lifting strap and a device to actuate the said lifting strap so as move the trolley from the rest position to the raised position, in that the said devices for actuating the lifting strap are located on the said telescopic parts, and in that the said lifting strap has a first end attached to the lifting strap actuating device, and a second end attached to an end support, fixed to one of the said transversal parts.

15. Trolley according to claim 14, characterised in that the said end support is fixed to the said transversal part that is not fixed to the telescopic part upon which the said lifting strap actuating devices are attached.

16. Trolley according to claim 14, characterised in that the said end support is fixed to the said transversal part that is fixed to the telescopic part upon which the said lifting strap actuating devices are attached, and in that the said lifting strap has a pulley system which passes by an intermediate support, which is fixed to the said transversal part that is not fixed to the telescopic part upon which the said lifting strap actuating devices are attached.

17. Trolley according to claim 14, characterised in that the said end support and/or the said intermediate support is/are part of the assembly comprising:

the free end of the straight central section of one of the said transversal parts;

a support, at least attached to a bracket which is part of the attachment of one of the said transversal parts with the free end of one of the telescopic parts.

18. Trolley according to claim 14, characterised in that the said strap actuating devices include a ratchet tensioner.

19. Trolley according to claim 3, characterised in that the said straight central section of each of the said transversal parts is a section of bar which is more or less cylindrical.

20. Trolley according to claim 4, characterised in that the said straight central section of each of the said transversal parts is a section of bar which is more or less cylindrical.

* * * * *